(12) United States Patent
Propheter-Hinckley et al.

(10) Patent No.: US 10,808,571 B2
(45) Date of Patent: Oct. 20, 2020

(54) GASPATH COMPONENT INCLUDING MINICORE PLENUMS

(71) Applicant: United Technologies Corporation, Farmington, CT (US)

(72) Inventors: Tracy A. Propheter-Hinckley, Manchester, CT (US); Matthew A. Devore, Rocky Hill, CT (US); Renee J. Behlman, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 421 days.

(21) Appl. No.: 15/629,812

(22) Filed: Jun. 22, 2017

(65) Prior Publication Data

US 2018/0371941 A1    Dec. 27, 2018

(51) Int. Cl.
*F01D 5/08* (2006.01)
*F01D 25/12* (2006.01)
(Continued)

(52) U.S. Cl.
CPC .............. *F01D 25/12* (2013.01); *F01D 5/08* (2013.01); *F01D 5/147* (2013.01); *F01D 5/186* (2013.01);
(Continued)

(58) Field of Classification Search
CPC . F01D 25/12; F01D 5/08; F01D 5/186; F01D 5/147; F01D 5/187; F05D 2240/81;
(Continued)

(56) References Cited

U.S. PATENT DOCUMENTS

| | | | | |
|---|---|---|---|---|
| 3,542,486 A | * | 11/1970 | Adiutori | F01D 5/187 416/90 R |
| 5,383,766 A | * | 1/1995 | Przirembel | F01D 5/186 416/92 |

(Continued)

FOREIGN PATENT DOCUMENTS

| | | |
|---|---|---|
| EP | 1586738 | 10/2005 |
| GB | 2358226 | 7/2001 |

(Continued)

OTHER PUBLICATIONS

European Search report for Application No. 18179169.0 dated Nov. 21, 2018.

*Primary Examiner* — Thomas N Moulis
(74) *Attorney, Agent, or Firm* — Carlson, Gaskey & Olds, P.C.

(57) ABSTRACT

A turbine engine component includes a wall extending from a leading edge to a trailing edge. The wall includes a hot side facing a gaspath when the gaspath component is in an installed state, and a cold side opposite the hot side. At least one minicore cooling circuit is disposed between the hot side and the cold side within the wall. At least one cooling fluid inlet connects the minicore cooling circuit to a coolant source. At least one film cooling hole connects the minicore cooling circuit to the hot side surface. The minicore cooling circuit includes an edge plenum having a thickness normal to the hot side surface that is larger than a thickness of the majority of the minicore cooling circuit normal to the hot side surface. The edge plenum is a portion of the at least one minicore cooling circuit most proximate to one of the leading edge and the trailing edge.

18 Claims, 7 Drawing Sheets

(51) Int. Cl.
  *F01D 5/18* (2006.01)
  *F01D 5/14* (2006.01)

(52) U.S. Cl.
  CPC ........ *F01D 5/187* (2013.01); *F05D 2230/211* (2013.01); *F05D 2240/81* (2013.01); *F05D 2260/204* (2013.01); *F05D 2300/608* (2013.01)

(58) Field of Classification Search
  CPC ......... F05D 2230/211; F05D 2300/608; F05D 2260/204
  See application file for complete search history.

(56) References Cited

U.S. PATENT DOCUMENTS

| | | | | |
|---|---|---|---|---|
| 5,392,515 | A * | 2/1995 | Auxier | B23P 15/04 |
| | | | | 29/463 |
| 5,626,462 | A | 5/1997 | Jackson et al. | |
| 6,213,714 | B1 * | 4/2001 | Rhodes | F01D 5/186 |
| | | | | 416/96 R |
| 6,254,334 | B1 * | 7/2001 | LaFleur | F01D 5/186 |
| | | | | 415/115 |
| 6,379,118 | B2 | 4/2002 | Lutum et al. | |
| 6,981,846 | B2 * | 1/2006 | Liang | F01D 5/186 |
| | | | | 416/97 R |
| 71,183,326 | | 10/2006 | Liang | |
| 7,311,498 | B2 * | 12/2007 | Cunha | F01D 5/186 |
| | | | | 416/97 R |
| 7,520,723 | B2 * | 4/2009 | Liang | F01D 5/187 |
| | | | | 416/97 R |
| 7,527,474 | B1 * | 5/2009 | Liang | F01D 5/186 |
| | | | | 416/1 |
| 7,600,966 | B2 | 10/2009 | Devore et al. | |
| 7,731,481 | B2 | 6/2010 | Cunha et al. | |
| 7,815,414 | B2 * | 10/2010 | Devore | F01D 5/186 |
| | | | | 415/115 |
| 7,862,299 | B1 * | 1/2011 | Liang | F01D 5/147 |
| | | | | 416/97 R |
| 7,866,948 | B1 * | 1/2011 | Liang | F01D 5/186 |
| | | | | 416/97 R |
| 7,988,418 | B2 * | 8/2011 | Cunha | B22C 9/04 |
| | | | | 416/193 A |
| 8,070,441 | B1 * | 12/2011 | Liang | F01D 5/186 |
| | | | | 416/97 R |
| 8,220,522 | B2 * | 7/2012 | Cunha | B22C 9/04 |
| | | | | 164/137 |
| 8,251,660 | B1 * | 8/2012 | Liang | F01D 5/187 |
| | | | | 415/115 |
| 8,297,927 | B1 * | 10/2012 | Liang | F01D 5/186 |
| | | | | 416/97 R |
| 8,944,141 | B2 * | 2/2015 | Propheter-Hinckley | |
| | | | | B22C 9/103 |
| | | | | 164/369 |
| 10,024,190 | B1 | 7/2018 | Memmen | |
| 2006/0222494 | A1 * | 10/2006 | Liang | F01D 5/187 |
| | | | | 416/97 R |
| 2007/0044933 | A1 * | 3/2007 | Santeler | B22C 7/02 |
| | | | | 164/44 |
| 2008/0286115 | A1 * | 11/2008 | Liang | F01D 5/186 |
| | | | | 416/97 R |
| 2010/0247328 | A1 * | 9/2010 | Cunha | F01D 5/186 |
| | | | | 416/97 R |
| 2013/0220571 | A1 * | 8/2013 | Mueller | B28B 1/24 |
| | | | | 164/44 |
| 2014/0199177 | A1 * | 7/2014 | Propheter-Hinckley | |
| | | | | F01D 5/187 |
| | | | | 416/97 R |
| 2015/0369054 | A1 * | 12/2015 | Propheter-Hinckley | |
| | | | | F01D 5/186 |
| | | | | 165/51 |
| 2016/0222794 | A1 | 8/2016 | Slavens et al. | |
| 2016/0363053 | A1 | 12/2016 | Mlranda et al. | |

FOREIGN PATENT DOCUMENTS

| | | |
|---|---|---|
| WO | 0100964 | 1/2001 |
| WO | 2013181132 | 12/2013 |
| WO | 2017196469 | 11/2017 |

* cited by examiner

GASPATH COMPONENT INCLUDING MINICORE PLENUMS

STATEMENT REGARDING FEDERALLY SPONSORED RESEARCH OR DEVELOPMENT

This invention was made with government support under Contract No. FA8650-15-D-2502-0002, awarded by the United States Air Force. The Government has certain rights in this invention.

TECHNICAL FIELD

The present disclosure relates generally to gaspath components for a gas turbine engine, and specifically to a gaspath component including minicore cooling circuits.

BACKGROUND

Gas turbine engines, such as those utilized in commercial and military aircraft, include a compressor that ingests and compresses air, a combustor where the compressed air is mixed with a fuel and ignited, and a turbine section across which the resultant combustion products are expanded. The expansion of the combustion products drives the turbine to rotate, which in turn drives rotation of a shaft. The shaft is connected to the compressor and, in some examples, a fan and drives rotation of the connected components.

Due to the combustion, the flow through the gaspath connecting the compressor, combustor, and turbine is extremely hot. In some locations, such as the turbine sections immediately downstream of the combustor, the heat can exceed a maximum temperature of the gaspath components. To prevent thermal damage at such components, active cooling is provided within the gaspath component. The active cooling can take many known forms, including the provision of a cooling flow through minicores within one or more walls of the gaspath component.

SUMMARY OF THE INVENTION

In one exemplary embodiment a turbine engine component includes a wall extending from a leading edge to a trailing edge, the wall including a hot side facing a gaspath when the gaspath component is in an installed state, and a cold side opposite the hot side, at least one minicore cooling circuit disposed between the hot side and the cold side within the wall, at least one cooling fluid inlet connecting the at least one minicore cooling circuit to a coolant source, at least one film cooling hole connecting the at least one minicore cooling circuit to the hot side surface, and the at least one minicore cooling circuit including an edge plenum having a thickness normal to the hot side surface that is larger than a thickness of the majority of the at least one minicore cooling circuit normal to the hot side surface, the edge plenum being a portion of the at least one minicore cooling circuit most proximate to one of the leading edge and the trailing edge.

In another example of the above described turbine engine component the edge plenum is positioned at the at least one cooling fluid inlet.

In another example of any of the above described turbine engine components at least one of the at least one film cooling holes connects the edge plenum to the hot side.

In another example of any of the above described turbine engine components the edge plenum is a leading edge plenum having a thickness normal to the hot side surface that is larger than a thickness of the majority of the at least one minicore cooling circuit normal to the hot side surface, the leading edge plenum being a portion of the at least one minicore cooling circuit most proximate to the leading edge.

In another example of any of the above described turbine engine components the leading edge plenum is configured to reverse a flow direction of a coolant passing through the at least one minicore circuit.

In another example of any of the above described turbine engine components the leading edge plenum is connected to the hot side surface by at least one of the at least one film cooling holes.

Another example of any of the above described turbine engine components further includes a trailing edge plenum having a thickness normal to the hot side surface that is larger than a thickness of the majority of the at least one minicore cooling circuit normal to the hot side surface, the trailing edge plenum being a portion of the at least one minicore cooling circuit most proximate to the trailing edge.

In another example of any of the above described turbine engine components the thickness of the trailing edge plenum and the thickness of the leading edge plenum are the same.

In another example of any of the above described turbine engine components the thickness of the trailing edge plenum and the thickness of the leading edge plenum are different.

In another example of any of the above described turbine engine components an outlet of the at least one minicore cooling circuit is connected to a trailing edge of the component.

In another example of any of the above described turbine engine components an outlet of the at least one minicore cooling circuit is connected to a leading edge of the component.

In another example of any of the above described turbine engine components a thickness of the wall normal to the hot side is approximately the same along a length of the at least one minicore cooling circuit.

In another example of any of the above described turbine engine components a thickness of the wall normal to the hot side at the edge plenum is larger than a thickness of the wall normal to the hot side along a remainder of the at least one minicore cooling circuit.

In another example of any of the above described turbine engine components the at least one minicore cooling circuit is an investment cast void, and wherein the film cooling holes are a product of a finishing process.

In another example of any of the above described turbine engine components the finishing process includes at least one of electrical discharge machining, laser drilling, and drilling.

In another example of any of the above described turbine engine components the at least one cooling fluid inlet is at least one impingement cooling fluid inlet.

In another example of any of the above described turbine engine components the at least one minicore cooling circuit includes at least one refractory metal core (RMC).

In one exemplary embodiment an investment casting core for a gaspath component includes a body defining a three dimensional negative space of at least one minicore cooling circuit, the at least one minicore cooling circuit having a leading edge plenum, wherein the leading edge plenum is thicker than at least a majority of the remainder of the at least one minicore cooling circuit.

In another example of the above described investment casting core for a gaspath component the body further defines a negative space corresponding to a trailing edge plenum, the trailing edge plenum being thicker than at least a majority of the remainder of the at least one minicore cooling circuit.

Another example of any of the above described investment casting cores for a gaspath component, further includes a plurality of posts extending outward from the negative space defining the leading edge plenum, each of the posts defining a negative space of an impingement cooling inlet.

These and other features of the present invention can be best understood from the following specification and drawings, the following of which is a brief description.

DETAILED DESCRIPTION OF AN EMBODIMENT

Figure 1:
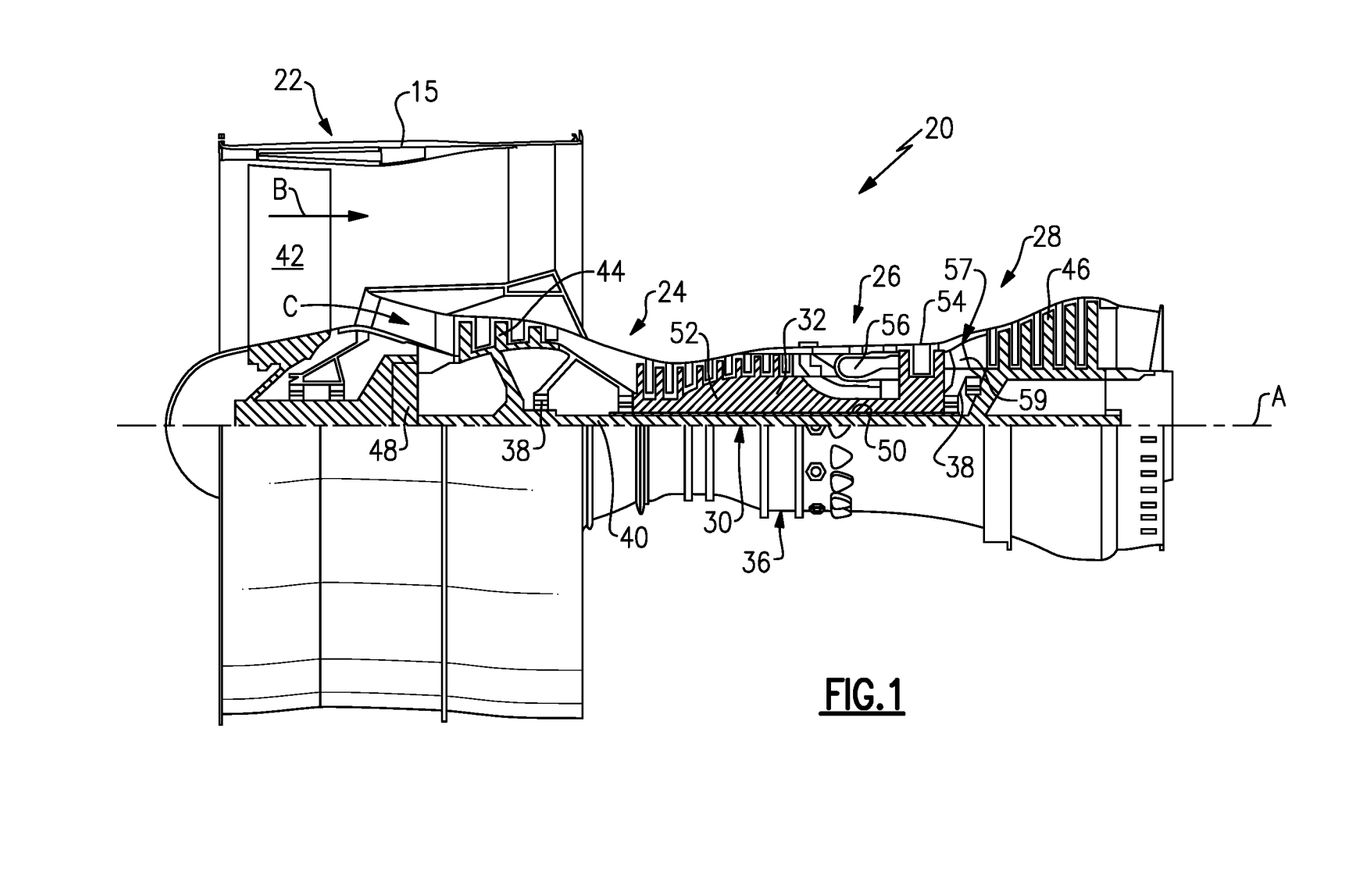
FIG. 1 schematically illustrates a gas turbine engine according to one example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram ° R)/(518.7° R)]^0.5. The "Low corrected fan tip speed" as disclosed herein according to one non-limiting embodiment is less than about 1150 ft/second (350.5 meters/second).

Figure 2:
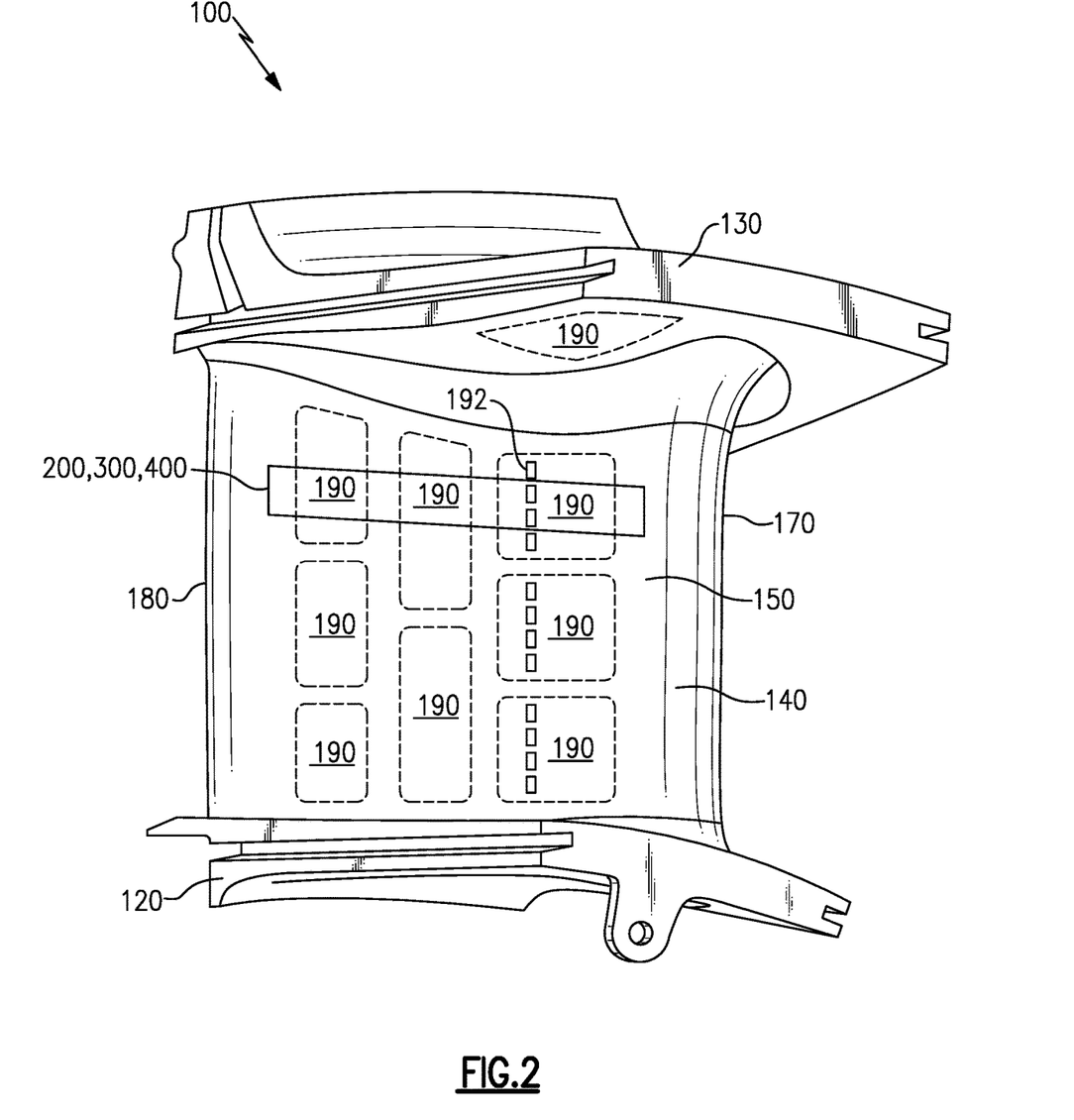
FIG. 2 schematically illustrates an exemplary gaspath component for the gas turbine engine of FIG. 1.

With continued reference to FIG. 1, FIG. 2 schematically illustrates a turbine vane 100 for inclusion in the turbine section 28 of the gas turbine engine 20. The turbine vane 100 includes a radially inner platform 120 and a radially outer platform 130. An airfoil 140 spans the platforms 120, 130. The airfoil 140 includes a pressure side 150 and a suction side (hidden) that join a leading edge 170 to a trailing edge 180. The suction side is opposite the pressure side 150.

In order to actively cool the turbine vane 100, a cooling fluid is passed through a minicore cooling circuit 190 positioned within the suction side wall and/or the pressure side wall 150. In some examples the cooling circuit 190 is additionally positioned in at least one of the platforms 120, 130. As used herein, a minicore cooling circuit refers to passages or channels that are cast into a wall of a structure and provide a cooling circuit. In some examples, the minicore cooling circuits 190 are connected to at least one other of the minicore cooling circuits 190 to create a single completed cooling circuit within the walls of the vane 100. In alternative examples, multiple distinct minicore cooling circuits 190 can be formed.

In order to facilitate cooling via the minicore cooling circuit 190, the pressure side wall 150, the suction side wall, and the walls of the platforms 120, 130 are cast as thin as is mechanically feasible.

In addition to cooling generated as a coolant flows through the minicore cooling circuit 190, film cooling holes 192 are included in some examples. The film cooling holes 192 provide a connection between internal passages of the minicore cooling circuit 190 and the exterior surface of the airfoil 140. The film cooling holes 192 expel coolant gasses from the minicore cooling circuit 190 along the surfaces of the vane 140 to generate a film cooling effect according to known film cooling techniques.

One method for manufacturing the minicore cooling circuits 190 is via the utilization of investment casting. In investment casting, a core made of a destructible material is created and inserted into the mold prior to casting a component. The core is shaped in a negative three dimensional image (negative space) of the minicore cooling circuit 190 being cast within the part. Once casting has been completed, the core is destroyed, and the remnants of the core are removed from the cast component via mechanical means, chemical means, or a combination of mechanical and chemical means. When utilizing investment casting cores, however, certain features are limited in dimension based on the dimensional tolerances or physical accessibility of the casting process. The film cooling holes 192 are one such feature. Due to limitations in investment casting processes, the film cooling holes 192 cannot be created in the right orientation for some applications.

In order to create aft flowing cooing holes in a forward flowing mini core, or any similarly sized/shaped holes for any other functionality, some exemplary manufacturing processes cast a component 100 without the film cooling holes 192, and incorporate the film cooling holes 192 as part of a finishing process. The film cooling holes 192 can be incorporated by drilling, electrical discharge machining (EDM), laser drilling, or any similar material removal process.

Due to the thinness of the minicore cooling circuits 190, in some examples the existing methods cannot add the film cooling holes 192 using known finishing processes without potentially penetrating, or otherwise damaging, the interior surface of the wall including the minicore cooling circuit 190. In order to allow for film cooling holes 192, and similar openings, to be incorporated post casting, the minicore cooling circuit 190 includes expanded plenums positioned at the location of the corresponding film cooling hole 192.

Figure 3A:
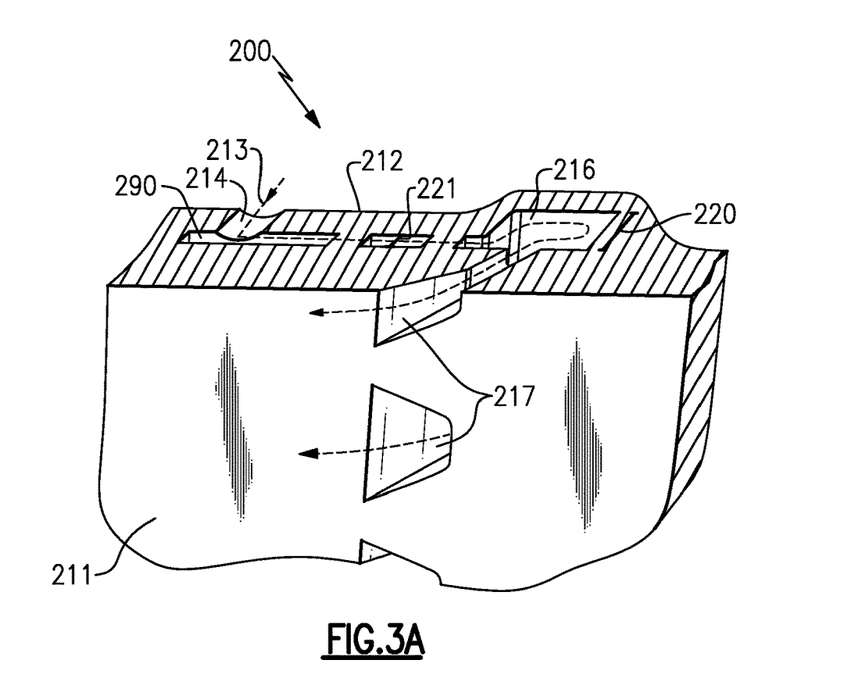
FIG. 3A schematically illustrates a cut out wall portion of a gaspath component according to one example.

With continued reference to FIG. 2, and with like numerals indicating like elements, FIG. 3A schematically illustrates a wall section 200 of a turbine vane. While illustrated as a portion of the pressure side wall 150, one of skill in the art will understand that the segment is representative of any type of component and could be a segment of any gaspath component including vanes, blade outer air seals, platforms, and the like.

The segment 200 is drawn through the pressure side wall 150, and includes a minicore cooling circuit 290. The minicore cooling circuit 290 is positioned between an exterior surface of the pressure side wall 150, referred to as a hot side surface 211, and an interior surface of the pressure side wall 150, referred to as a cold side surface 212. Cold air 213, or another cooling gas, is fed into the minicore cooling circuit 290 through one or more impingement feed holes 214 positioned on the cold side surface 212. The impingement feed holes 214 are cast holes that are manufactured using an investment casting technique, such as the technique described above. The cold air 213 flows through the minicore cooling circuit 290 and into a leading edge cooling plenum 216. The cooling plenum 216 operates to turn the cooling air 213, and allows the cooling air 213 to exit film cooling holes 217 in a desired direction.

The cooling plenum 216 is defined by a thickness 220 normal to the hot side surface 211 that is larger than a thickness 221 of the remainder of the minicore cooling circuit 290 normal to the hot side surface 211. In the illustrated example, a corresponding thickness of the pressure side wall 250 at the location of the plenum 216 is further increased to accommodate the plenum 216. In alternative examples, where weight of the gaspath component is less of a concern, the thickness of the entire wall can be cast sufficient to accommodate the plenum 216, despite the plenum 216 only being present at certain positions.

In addition to the plenum 216 providing sufficient thickness to allow drilling, EDM, or other post casting manufacturing methods to create film cooling holes 217 that connected the minicore cooling circuit 290 with the hot side surface 211, the plenum 216 also allows for the redirection of the cooling air 213. Absent the plenum 216, the cooling air 213 travels through minicore cooling circuit in a first direction, and the air exiting the minicore cooling circuit 290 is required to flow in generally the same direction due to the flow rate of the fluid passing through the minicore cooling circuit 290. By incorporating the plenum 216 at the film cooling hole 217, the flow 213 can be reversed, and the cooling flow 213 exits the minicore cooling circuit 290 in approximately the opposite direction of the flow 213 through the minicore 290.

Figure 3B:
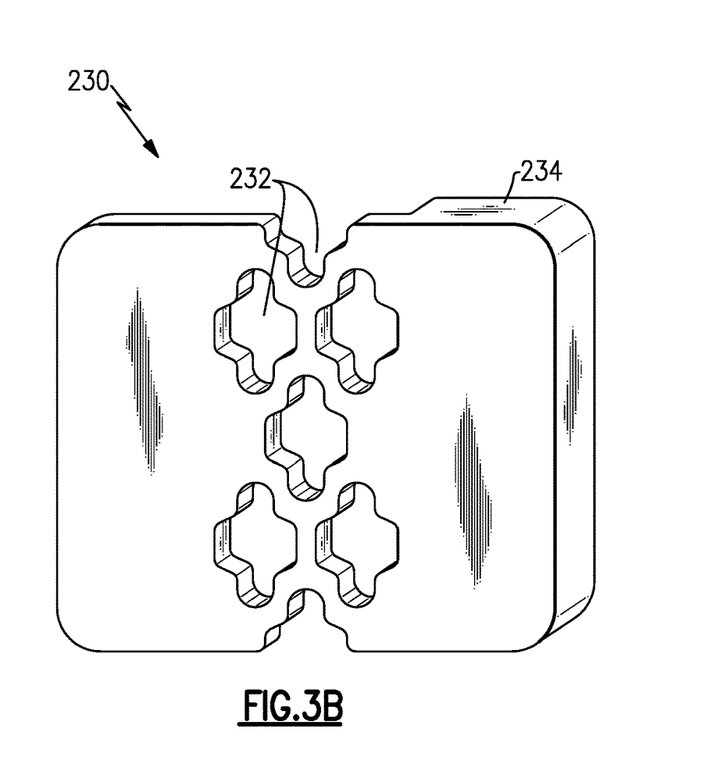
FIG. 3B schematically illustrates a first side of an investment casting core for creation of the cut out wall portion of FIG. 3A.
Figure 3C:
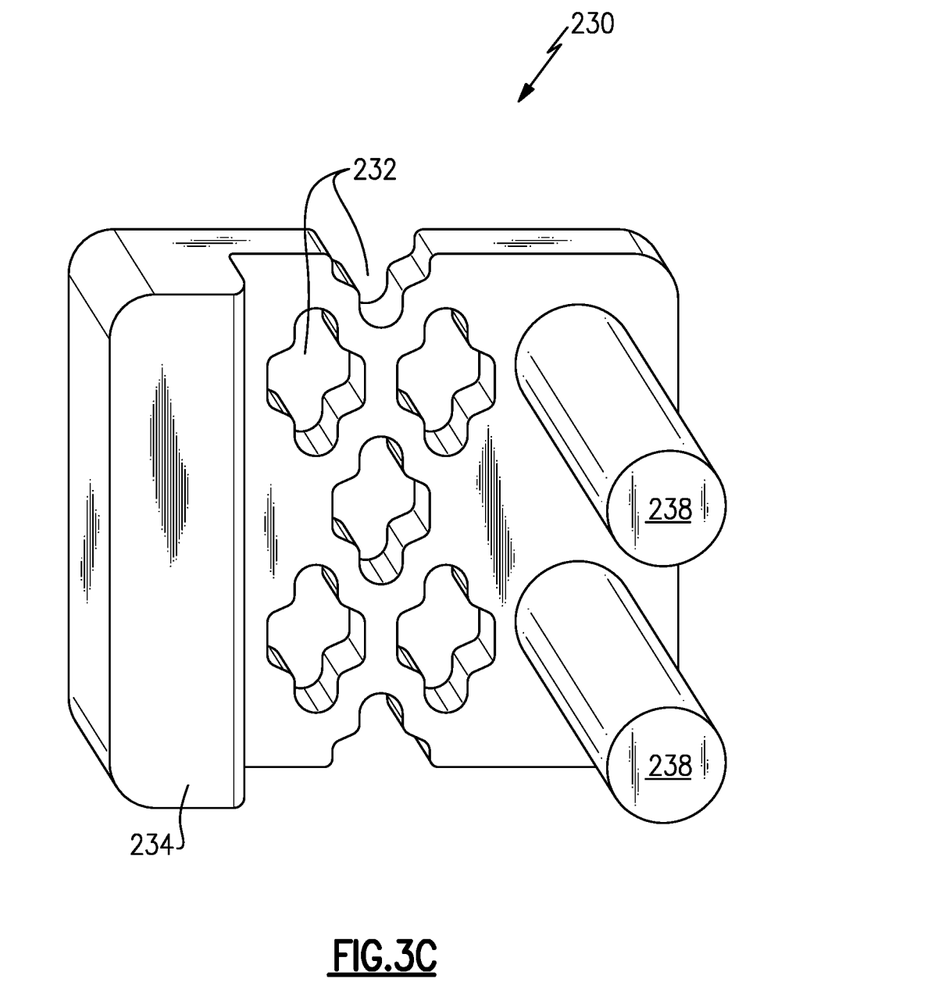
FIG. 3C schematically illustrates a second side, opposite the first side, of the investment casting core of FIG. 3B.

With continued reference to FIG. 3A, FIGS. 3B and 3C illustrate a portion of an investment casting core 230 from a hot side view (FIG. 3B) and a cold side view (FIG. 3C). The investment casting core 230 is constructed of a solid destructible material, and defines a negative space of the minicore cooling circuit 290. Multiple openings 232 define positions where internal posts within the minicore cooling circuit 290 will be located. A thicker section 234 defines the geometry of the plenum 216, and extends an entire radial height of the minicore cooling circuit 290. In alternative examples where the gaspath component is not radially aligned, such as blade outer air seals, and platforms, the thicker section 234 extends an entire length of the minicore cooling circuit approximately normal to a general direction of fluid flow through the minicore circuit 290.

Figure 4A:
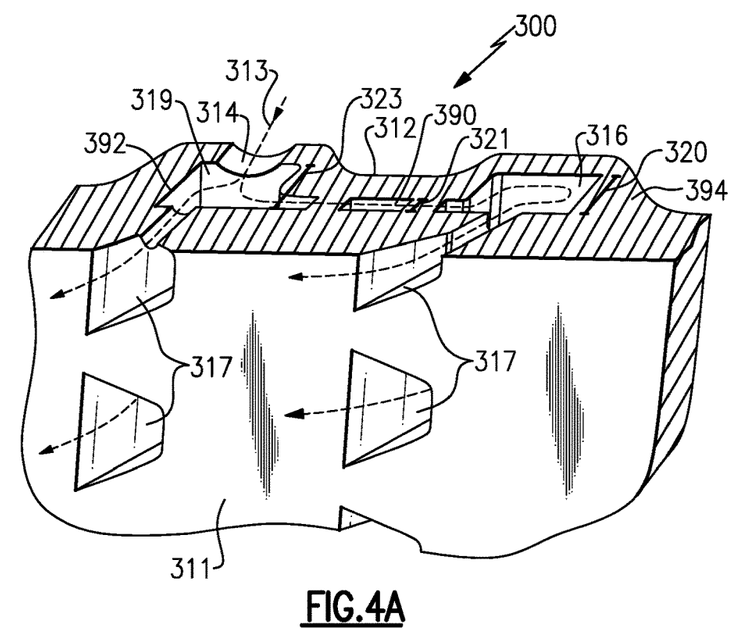
FIG. 4A schematically illustrates a cut out wall portion of a gaspath component according to one example.

In some alternate examples, it can be desirable to connect film cooling holes at a fluid input of a minicore, as well as at the fluid output as indicated in the example of FIG. 3A. FIG. 4A schematically illustrates a cut out wall portion 300 of a gaspath component including film cooling holes 317 connected at a fluid input end 392 as well as at a fluid output end 394 of a minicore 390 according to one example.

As with the previous example, the segment 300 is drawn through the pressure side wall 150, and includes a minicore cooling circuit 390. The minicore cooling circuit 390 is positioned between a hot side wall 311, and a cold side wall 312. Cold air 313, or another cooling gas, is fed into the mini core cooling circuit 390 through one or more impingement feed holes 314 positioned on the cold side 312 into a trailing edge plenum 319. The impingement feed holes 314 are cast holes that are manufactured using an investment casting technique, such as the technique described above. The cold air 313 flows through the minicore cooling circuit 390 and into a leading edge cooling plenum 316. The leading edge cooling plenum 316 operates to turn the cooling air 313, and allows the cooling air 313 to exit film cooling holes 317 oriented in a downstream direction.

The leading edge cooling plenum 316 is defined by a thickness 320 normal to the hot side surface 311 that is larger than a thickness 321 of the majority of the minicore cooling circuit 390 normal to the hot side surface 311. Similarly, the trailing edge plenum 319 is defined by a thickness 323 normal to the hot side surface 311 that is larger than a thickness 321 of the majority of the minicore cooling circuit 390. In the illustrated example, the thickness of the leading edge plenum 320 and the thickness of the trailing edge plenum 319 are the same. One of skill in the art will appreciate that the plenums 316, 319 could be varied and still fall within the present disclosure. Further, one of skill in the art will appreciate that the plenums 316, 319 are referred to by the edge to which they are most proximate, and the plenums 316, 319 may not actually be at the leading edge 170 or trailing edge 180 of the component 100 including the segment 300.

A corresponding thickness of the pressure side wall 350 at the location of the plenums 316, 319 is further increased to accommodate the plenums 316, 319. In alternative examples, where weight of the gaspath component is less of a concern, the thickness of the entire wall can be cast sufficient to accommodate the plenums 316, 319, despite the plenums 316, 319 only being present at certain positions.

In the illustrated segment 300 of FIG. 3A, the trailing edge plenum 319 provides sufficient thickness in the wall for the cooling holes 317 to be drilled, machined, or otherwise connected to the plenum 319 in a post casting manufacturing process. As the fluid entering the minicore circuit 390 at the trailing edge plenum 319 is traveling at approximately the same direction as the cooling holes 317, no turning is required in the trailing edge plenum 319. The leading edge plenum 316 operates in a fundamentally similar manner, and provides the same benefits, as the leading edge plenum 216 of FIG. 3A.

Figure 4B:
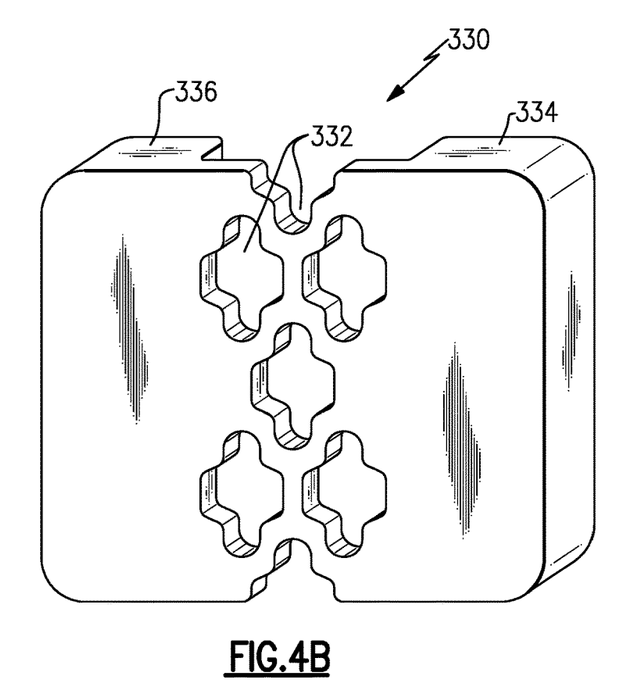
FIG. 4B schematically illustrates a first side of an investment casting core for creation of the cut out wall portion of FIG. 4A.
Figure 4C:
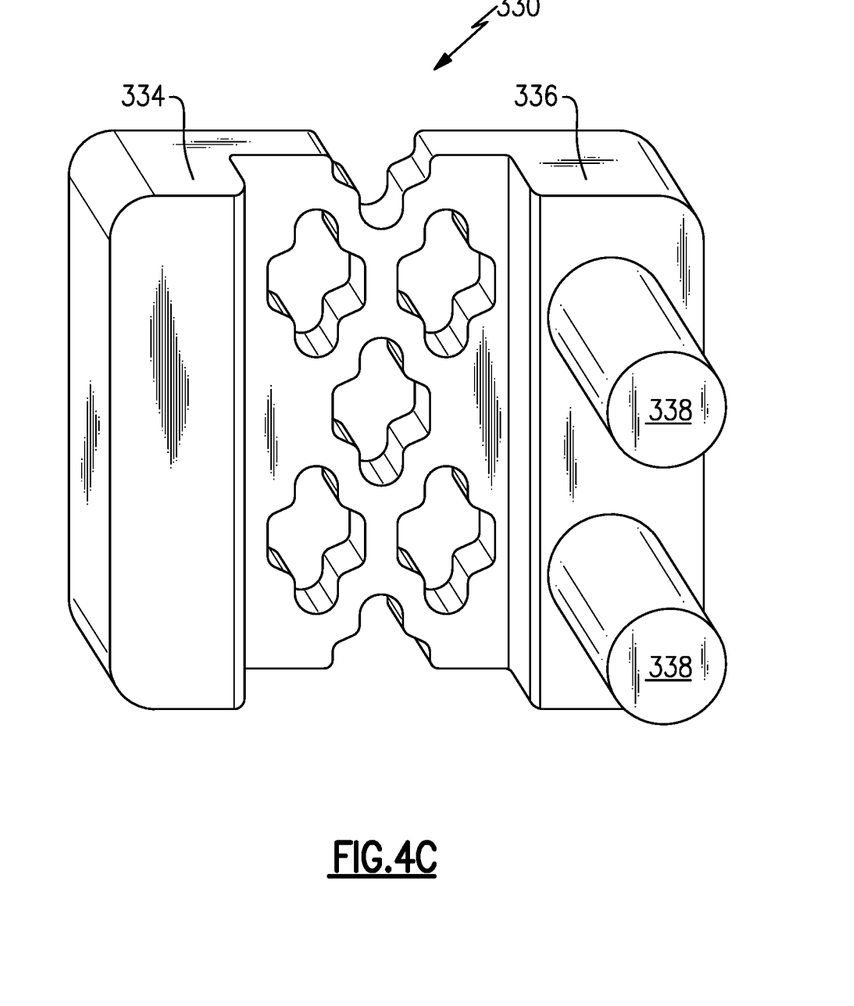
FIG. 4C schematically illustrates a second side, opposite the first side, of the investment casting core of FIG. 4B.

With continued reference to FIG. 4A, FIGS. 4B and 4C illustrate a portion of an investment casting core 330 from a hot side view (FIG. 3B) and a cold side view (FIG. 3C). The investment casting core 330 is constructed of a solid destructible material, and defines a negative space of the minicore cooling circuit 390. Multiple openings 332 define positions where internal structures of the minicore cooling circuit 390 will be located. Thicker sections 334, 336 define the geometry of the plenums 316, 319 and extend an entire radial height of the minicore circuit 390. In alternative examples, such as blade outer air seals, and platforms, the thicker sections 334, 336 extends an entire length of the minicore cooling circuit 390 approximately normal to a general direction of fluid flow through the minicore cooling circuit 390. Also included in the investment casting core 330 are multiple posts 338 that define a negative space of the impingement holes 314 which allow cooling fluid into the minicore circuit 390.

Figure 5:
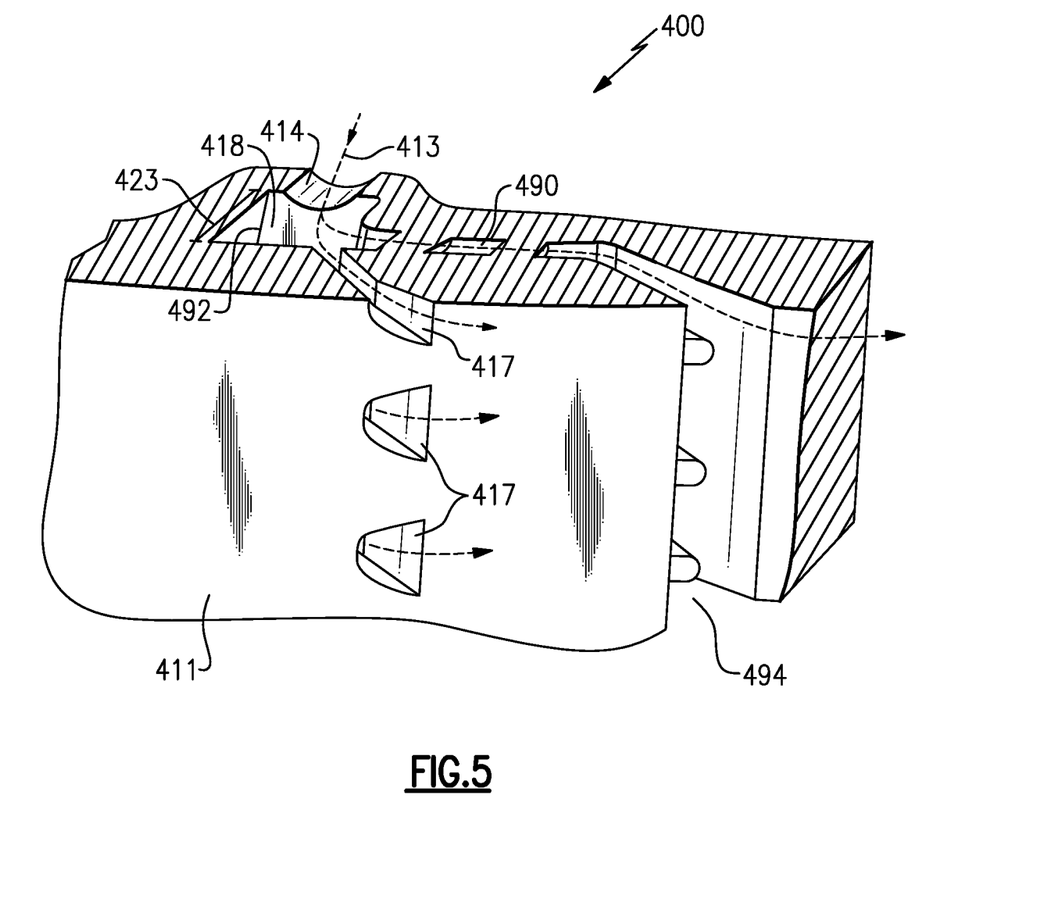
FIG. 5 schematically illustrates a cut out wall portion of a gaspath component according to one example.

In yet a further alternate examples, it can be desirable to connect film cooling holes at a fluid input of a minicore cooling circuit, and to output the fluid from the minicore cooling circuit along a trailing edge of the component. FIG. 5 schematically illustrates a cut out wall portion 400 of a gaspath component including film cooling holes 417 connected to a minicore cooling circuit 490 at a fluid input end 492 according to one example. Also included in the example is a cast opening 494 at a trailing edge end of the minicore cooling circuit 490. As in the previous segment 300, the cooling fluid enters the minicore cooling circuit 490 through impingement holes 414 into a leading edge plenum 418. The cooling fluid 413 passes through the minicore cooling circuit 490 to the trailing edge exit 494. Also connected to the leading edge plenum 418 are multiple film cooling holes 417, each of which is incorporated into the segment 400 after casting using known material removal techniques. In order to facilitate the film cooling holes 417, the leading edge plenum 418 is thicker than a remainder of the minicore cooling circuit 490 normal to a hot side 411 of the wall.

While described above as distinct examples included in distinct gaspath components, one of skill in the art will appreciate that the segments 200, 300, 400 can be distinct segments of a single gaspath component, or can be included in any combination in a single gaspath component. Further, while disclosed and discussed above in terms of a general "minicore", it should be appreciated that the disclosed minicores can, in some examples, be refractory metal cores (RMCs). In alternative examples the minicores can be alternative constructions.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine component comprising:
    a wall extending from a leading edge to a trailing edge, the wall including a hot side facing a gaspath when said gaspath component is in an installed state, and a cold side opposite said hot side;
    at least one minicore cooling circuit disposed between said hot side and said cold side within said wall;
    at least one cooling fluid inlet connecting the at least one minicore cooling circuit to a coolant source;
    at least one film cooling hole connecting said at least one minicore cooling circuit to said hot side surface; and
    the at least one minicore cooling circuit including an edge plenum having a thickness normal to the hot side surface that is larger than a thickness of the majority of the at least one minicore cooling circuit normal to the hot side surface, the edge plenum being a portion of the at least one minicore cooling circuit most proximate to one of the leading edge and the trailing edge, and at least one of the at least one film cooling holes directly connects the edge plenum to the hot side surface.

2. The turbine engine component of claim 1, further comprising a second edge plenum is-positioned at the at least one cooling fluid inlet.

3. The turbine engine component of claim 1, wherein at least one of the at least one film cooling holes connects the edge plenum to the hot side.

4. The turbine engine component of claim 1, wherein the edge plenum is a leading edge plenum having a thickness normal to the hot side surface that is larger than a thickness of the majority of the at least one minicore cooling circuit normal to the hot side surface, the leading edge plenum being a portion of the at least one minicore cooling circuit most proximate to the leading edge.

5. The turbine engine component of claim 4, wherein the leading edge plenum is configured to reverse a flow direction of a coolant passing through the at least one minicore circuit.

6. The turbine engine component of claim 5, wherein the leading edge plenum is connected to the hot side surface by at least one of the at least one film cooling holes.

7. The turbine engine component of claim 4, further comprising a trailing edge plenum having a thickness normal to the hot side surface that is larger than a thickness of the majority of the at least one minicore cooling circuit normal to the hot side surface, the trailing edge plenum being a portion of the at least one minicore cooling circuit most proximate to the trailing edge.

8. The turbine engine component of claim 7, wherein the thickness of the trailing edge plenum and the thickness of the leading edge plenum are the same.

9. The turbine engine component of claim 7, wherein the thickness of the trailing edge plenum and the thickness of the leading edge plenum are different.

10. The turbine engine component of claim 1, wherein a thickness of the wall normal to the hot side is approximately the same along a length of the at least one minicore cooling circuit.

11. The turbine engine component of claim 1, wherein a thickness of the wall normal to the hot side at the edge plenum is larger than a thickness of the wall normal to the hot side along a remainder of the at least one minicore cooling circuit.

12. The turbine engine component of claim 1, wherein the at least one minicore cooling circuit is an investment cast void, and wherein the film cooling holes are a product of a finishing process.

13. The turbine engine component of claim 12, wherein the finishing process includes at least one of electrical discharge machining, laser drilling, and drilling.

14. The turbine engine component of claim 1, wherein the at least one cooling fluid inlet is at least one impingement cooling fluid inlet.

15. The turbine engine component of claim 1, wherein the at least one minicore cooling circuit includes at least one refractory metal core (RMC).

16. An investment casting core for a gaspath component comprising:
 a body defining a three dimensional structure, wherein the three dimensional stricter is a negative space of at least one minicore cooling circuit, the at least one minicore cooling circuit having a leading edge plenum, wherein the leading edge plenum is thicker than at least a majority of the remainder of the at least one minicore cooling circuit.

17. The investment casting core of claim 16, wherein the body further defines a negative space corresponding to a trailing edge plenum, the trailing edge plenum being thicker than at least a majority of the remainder of the at least one minicore cooling circuit.

18. The investment casting core of claim 16, further comprising a plurality of posts extending outward from the negative space defining the leading edge plenum, each of the posts defining a negative space of an impingement cooling inlet.

* * * * *